(12) United States Patent
Watanabe

(10) Patent No.: US 11,558,722 B2
(45) Date of Patent: Jan. 17, 2023

(54) MANAGEMENT APPARATUS, COMMUNICATION APPARATUS, SYSTEM, METHOD, AND NON-TRANSITORY COMPUTER READABLE MEDIUM

(71) Applicant: NEC Corporation, Tokyo (JP)

(72) Inventor: Yoshinori Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/270,527

(22) PCT Filed: May 23, 2019

(86) PCT No.: PCT/JP2019/020483
§ 371 (c)(1),
(2) Date: Feb. 23, 2021

(87) PCT Pub. No.: WO2020/044676
PCT Pub. Date: Mar. 5, 2020

(65) Prior Publication Data
US 2021/0352454 A1    Nov. 11, 2021

(30) Foreign Application Priority Data

Aug. 28, 2018    (JP) .............................. JP2018-159041

(51) Int. Cl.
*H04W 4/50* (2018.01)
*H04L 41/14* (2022.01)
*H04W 24/08* (2009.01)
*H04W 28/18* (2009.01)
*H04W 56/00* (2009.01)

(52) U.S. Cl.
CPC ............. *H04W 4/50* (2018.02); *H04L 41/145* (2013.01); *H04W 24/08* (2013.01); *H04W 28/18* (2013.01);
(Continued)

(58) Field of Classification Search
None
See application file for complete search history.

(56) References Cited

U.S. PATENT DOCUMENTS 9,705,751 B1 *   7/2017   Yi ........................ H04L 41/0823
10,349,240 B2 *  7/2019   Senarath ................. H04W 4/24
(Continued)

FOREIGN PATENT DOCUMENTS

EP    2750432 A1 *   7/2014   ............... H04L 1/00
EP    3046289 A1 *   7/2016   ......... H04L 41/0823
(Continued)

OTHER PUBLICATIONS

International Search Report for PCT Application No. PCT/JP2019/020483, dated Jul. 9, 2019.
(Continued)

*Primary Examiner* — Anh Vu H Ly

(57) ABSTRACT

An object of the present disclosure is to provide a management apparatus, a communication apparatus, a system, a method, and a program capable of providing a service that meets a targeted KPI. A management apparatus according to the present disclosure includes: KPI management means for acquiring a target Key Performance Indicator (KPI) of a service that is provided to a communication terminal by a business operator; operation state acquisition means for acquiring element data regarding a component necessary for the service, the element data indicating a feature of a control system of the service; KPI prediction means for calculating a predicted KPI which is a predicted value of the KPI of the service based on the element data; and communication performance calculation means for, when the KPI is defined so that a value becomes lower as performance becomes better, detecting the component in which the predicted KPI is equal to or greater than the target KPI.

14 Claims, 4 Drawing Sheets

(52) U.S. Cl.
CPC ... *H04W 56/0045* (2013.01); *H04W 56/0055* (2013.01)

(56) References Cited

U.S. PATENT DOCUMENTS

| | | |
|---|---|---|
| 2015/0009826 A1 | 1/2015 | Ma et al. |
| 2015/0281004 A1 | 10/2015 | Kakadia et al. |
| 2015/0289149 A1 | 10/2015 | Ouyang et al. |
| 2017/0272319 A1 | 9/2017 | Sheen et al. |
| 2017/0290024 A1* | 10/2017 | Ouyang .............. H04W 72/085 |
| 2017/0325120 A1 | 11/2017 | Szilagyi et al. |
| 2017/0353991 A1 | 12/2017 | Tapia |

FOREIGN PATENT DOCUMENTS

| | | |
|---|---|---|
| JP | 2011-250234 A | 12/2011 |
| JP | 2012-049598 A | 3/2012 |
| JP | 2014-209701 A | 11/2014 |
| JP | 2015-513829 A | 5/2015 |
| JP | 2016-143980 A | 8/2016 |
| JP | 2018-506199 A | 3/2018 |
| WO | WO-2016064308 A1 * | 4/2016 ......... H04L 47/2416 |

OTHER PUBLICATIONS

Extended European Search Report for EP Application No. 19855962.7 dated Nov. 4, 2021.
Japanese Office Action for JP Application No. 2020-540062 dated Apr. 12, 2022 with English Translation.

* cited by examiner

MANAGEMENT APPARATUS, COMMUNICATION APPARATUS, SYSTEM, METHOD, AND NON-TRANSITORY COMPUTER READABLE MEDIUM

This application is a National Stage Entry of PCT/JP2019/020483 filed on May 23, 2019, which claims priority from Japanese Patent Application 2018-159041 filed on Aug. 28, 2018, the contents of all of which are incorporated herein by reference, in their entirety.

TECHNICAL FIELD

The present disclosure relates to a management apparatus, a communication apparatus, a system, a method, and a program, and in particular, to a management apparatus, a communication apparatus, a system, a method, and a program capable of providing a service that meets a targeted KPI.

BACKGROUND ART

Service providers use radio resources to provide real-time services to Internet of Things (IoT) devices from communication apparatuses such as base stations. It should be noted that the real-time service refers to a service that monitors and analyzes the state of an IoT device and the state of a user, and takes measures based on the results of the monitoring and the analysis in real time through an application or communication. The state of an IoT device is, for example, a position and a speed of a vehicle. The state of a user is, for example, the degree of arousal of a driver who is driving a vehicle. The measures include alerting a driver and controlling a vehicle. Examples of the real-time service include safe driving support, automated driving, remote control of equipment, control of entrance/exit gates, control of robots, control of drones, a video image monitoring including control of cameras, and Augmented Reality/Virtual Reality (AR/VR). When a real-time service is provided to an IoT device, a management apparatus controls the service provided to the IoT device from a communication apparatus so that it meets a targeted Key Performance Indicator (KPI). A KPI is a quantitative indicator for measuring the quality of experience of a service. In a service using radio resources, a KPI depends on the operation environment of an IoT device.

Patent Literature 1 discloses that a network node, such as a QoE orchestrator, monitors data traffic related to a terminal device to detect a data flow related to an application session, derives resource requirement information defining a required QoE level to be provided to the terminal device regarding the application session, performs QoE measurements in order to obtain information on QoE experienced by the terminal device regarding the application session, executes, based on the QoE measurements, one or a plurality of actions in order to enforce the QoE of the application session to meet the resource requirement. Patent Literature 1 does not disclose that element data regarding a component necessary for providing a service is acquired and a predicted KPI of the service is calculated based on the element data.

Patent Literature 2 discloses a radio communication control apparatus including: a communication unit that performs radio communication; an achievement value acquisition unit that acquires an achievement value of a quality of experience, which is a quality regarding the radio communication performed by the communication unit and is a quality corresponding to a user's experience; an observation result acquisition unit that acquires an observation result including a sensing result regarding the radio communication performed by the communication unit; a target value generating unit that generates a target value which is a targeted value of the quality of experience by using the observation result; a calculation unit that calculates difference information indicating a difference between the target value and the achievement value; and a control unit that controls at least one of allocation of radio resources using the observation result and a change of a radio network topology so that the difference indicated by the difference information becomes small. Patent Literature 1 does not disclose that element data regarding a component required for providing a service is acquired and a predicted KPI of the service is calculated based on the element data.

CITATION LIST

Patent Literature

Patent Literature 1: Published Japanese Translation of PCT International Publication for Patent Application, No. 2018-506199

Patent Literature 2: Japanese Unexamined Patent Application Publication No. 2014-209701

SUMMARY OF INVENTION

Technical Problem

As described above, in a service using radio resources, a KPI depends on the operation environment of IoT devices or the like. Therefore, communication performance for achieving a targeted KPI differs for each IoT device. In spite of the above, when lines of the same communication performance are provided equally to all the IoT devices, some IoT devices have insufficient communication performance. Consequently, there is a problem that it is difficult to provide a service that meets the targeted KPI. Note that a communication terminal described later includes an IoT device.

An object of the present disclosure is to provide a management apparatus, a communication apparatus, a system, a method, and a program that solve the above-described problem.

Solution to Problem

A management apparatus according to the present disclosure includes:

KPI management means for acquiring a target Key Performance Indicator (KPI) of a service that is provided to a communication terminal by a business operator;

operation state acquisition means for acquiring element data regarding a component necessary for the service, the element data indicating a feature of a control system of the service;

KPI prediction means for calculating a predicted KPI which is a predicted value of the KPI of the service based on the element data;

communication performance calculation means for, when the KPI is defined so that a value becomes lower as performance becomes better, detecting the component in which the predicted KPI is equal to or greater than the target KPI and calculating a target value of communication performance of the detected component so that the predicted KPI becomes less than the target KPI based on the predicted KPI and the target KPI; and communication performance notification means for notifying a communication apparatus to which the communication terminal is connected of the target value of the communication performance.

A communication apparatus according to the present disclosure includes:

communication performance acquisition means for acquiring a target value of communication performance for a service provided to a communication terminal; and communication control means for controlling communication with the communication terminal based on the target value.

A system according to the present disclosure includes a communication terminal, a communication apparatus configured to provide a service to the communication terminal, and a management apparatus configured to manage the communication apparatus and the communication terminal, in which the management apparatus comprises:
KPI management means for acquiring a target Key Performance Indicator (KPI) of the service that is provided to the communication terminal by a business operator;
operation state acquisition means for acquiring element data regarding a component necessary for the service, the element data indicating a feature of a control system of the service;
KPI prediction means for calculating a predicted KPI which is a predicted value of the KPI of the service based on the element data;
communication performance calculation means for, when the KPI is defined so that a value becomes lower as performance becomes better, detecting the component in which the predicted KPI is equal to or greater than the target KPI and calculating a target value of communication performance of the detected component so that the predicted KPI becomes less than the target KPI based on the predicted KPI and the target KPI; and
communication performance notification means for notifying the communication apparatus to which the communication terminal is connected of the target value of the communication performance, and the communication apparatus comprises:
communication performance acquisition means for acquiring the target value of the communication performance for the service provided to the communication terminal; and
communication control means for controlling communication with the communication terminal based on the target value.

A method according to the present disclosure includes:
acquiring a target Key Performance Indicator (KPI) of a service provided to a communication terminal;
acquiring element data regarding a component necessary for the service, the element data indicating a feature of a control system of the service;
calculating a predicted KPI which is a predicted value of the KPI of the service based on the element data;
when the KPI is defined so that a value becomes lower as performance becomes better, detecting the component in which the predicted KPI is equal to or greater than the target KPI and calculating a target value of communication performance of the detected component so that the predicted KPI becomes less than the target KPI based on the predicted KPI and the target KPI; and
notifying a communication apparatus to which the communication terminal is connected of the target value of the communication performance.

A program according to the present disclosure causes a computer to:
acquire a target Key Performance Indicator (KPI) of a service provided to a communication terminal;
acquire element data regarding a component necessary for the service, the element data indicating a feature of a control system of the service;
calculate a predicted KPI which is a predicted value of the KPI of the service based on the element data;
when the KPI is defined so that a value becomes lower as performance becomes better, detect the component in which the predicted KPI is equal to or greater than the target KPI and calculate a target value of communication performance of the detected component so that the predicted KPI becomes less than the target KPI based on the predicted KPI and the target KPI; and
notify a communication apparatus to which the communication terminal is connected of the target value of the communication performance.

Advantageous Effects of Invention

According to the present disclosure, it is possible to provide a management apparatus, a communication apparatus, a system, a method, and a program capable of providing a service that meets a targeted KPI.

DESCRIPTION OF EMBODIMENTS

Example embodiments according to the present disclosure will be described hereinafter with reference to the drawings. The same components are denoted by the same reference signs throughout the drawings and redundant descriptions will be omitted as appropriate.

First Example Embodiment

First, an overview of a management apparatus according to a first example embodiment is described.

Figure 1:
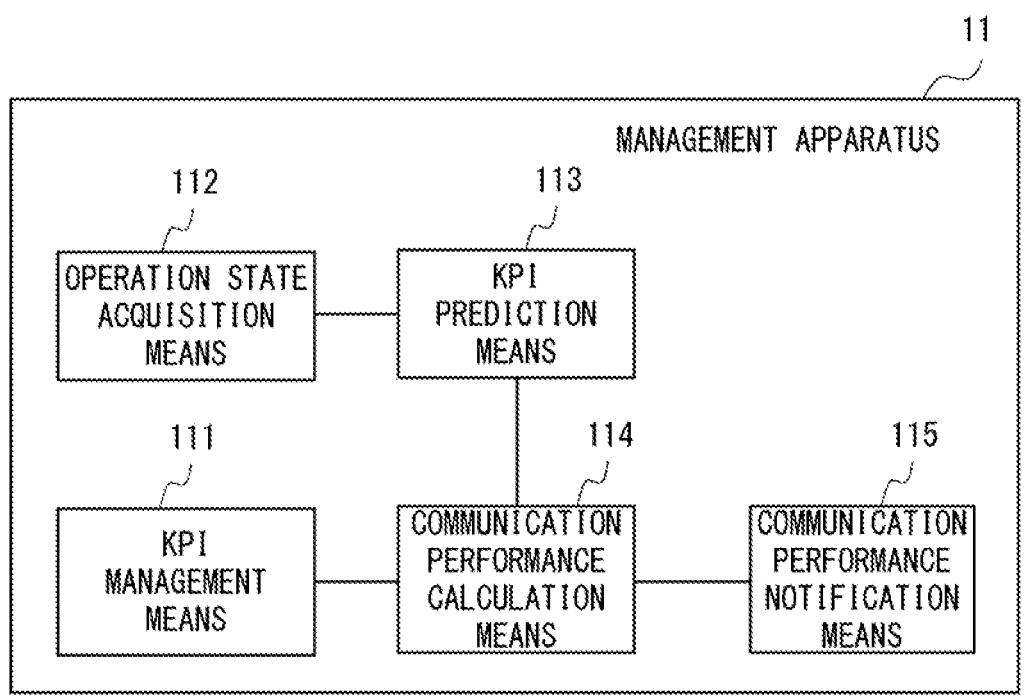
FIG. 1 is a block diagram illustrating a management apparatus according to a first example embodiment.

FIG. 1 is a block diagram illustrating the management apparatus according to the first example embodiment.

As shown in FIG. 1, a management apparatus 11 according to the first example embodiment includes KPI management means 111, operation state acquisition means 112, KPI prediction means 113, communication performance calculation means 114, and communication performance notification means 115.

The KPI management means 111 acquires a target Key Performance Indicator (KPI) of a service that is provided to a communication terminal by a business operator. Note that a business operator may be referred to as a service provider.

A KPI is a quantitative indicator for measuring the quality of experience of a service. With the diversification of services, the KPI depends not only on the communication performance between a server that provides a service and a communication terminal that receives the service but also on the operation environment of the communication terminal. Note that a targeted KPI is referred to as a target KPI.

For example, in a safe driving support service for a vehicle, the KPIs include indicators such as a Time To Collision (TTC), a Time Head Way (THW), and a Risk Feeling (RF). These KPIs (indicators) depend on the distance between vehicles and the speed at which a vehicle travels.

Further, in an AR/VR service, examples of the KPI include a synthesis error of AR and a response delay of VR. The synthetic error of AR is an error of geometric alignment between the real world and a virtual world. The response delay of VR is a time until a motion of a user's head is reflected on an image displayed on a screen. The synthetic error of AR and the response delay of VR depend on the moving speed of an AR/VR device and the amount of image data which the AR/VR device transmits to and receives from a server.

Further, in a video image monitoring service, examples of the KPI include an object recognition rate of a monitored video image. The object recognition rate of a monitored video image depends on the moving speed of an object to be monitored and the resolution of a video image.

Further, in a remote control service of an entrance/exit gate, examples of the KPI include a success rate of opening/closing a gate. The success rate of opening/closing a gate depends on the speed of an object passing through the gate.

As described above, the KPI depends on the operation environment of the communication terminal. Therefore, the communication performance necessary for achieving a target KPI differs for each communication terminal. In spite of the above, when lines of the same communication performance are provided equally to all the communication terminals, some communication terminals having insufficient communication performance cannot meet the target KPI.

Therefore, the management apparatus 11 performs control so that each communication terminal achieves the target KPI based on the response characteristics of the communication terminal and a user as follows.

As shown in FIG. 1, the operation state acquisition means 112 of the management apparatus 11 acquires element data regarding a component necessary for a service, the element data indicating a feature of a control system of the service. The component is necessary to provide a service. The component includes at least one of the communication terminal and a communication line between the communication terminal and the communication apparatus. The element data is data necessary for calculation of a KPI, which is one of the quality indicators of the service. The element data regarding the communication terminal is, for example, data indicating features such as identification information, an internal state, an external state, and a version of control software of the device. The element data regarding a user is, for example, data indicating features such as identification information of a user and a state of a user. The communication line may be a radio line using radio techniques.

The KPI prediction means 113 calculates a time series of a predicted KPI which is a predicted value of the KPI of a service based on the element data.

The communication performance calculation means 114 detects a component in which the predicted KPI is less than the target KPI. The communication performance calculation means 114 calculates a target value of the communication performance of the detected component based on the predicted KPI and the target KPI. That is, the communication performance calculation means 114 calculates a target value of the communication performance of the component in which the predicted KPI is less than the target KPI based on the predicted KPI and the target KPI. The communication performance calculation means 114 calculates a target value of the communication performance so that, for example, the predicted KPI becomes equal to or greater than the target KPI. Note that when the KPI is defined so that a value becomes lower as performance becomes better, the communication performance calculation means 114 detects a component in which the predicted KPI is equal to or greater than the target KPI, and calculates a target value of the communication performance so that the predicted KPI becomes less than the target KPI.

In order to control the communication performance of the communication line between the communication terminal and the communication apparatus, the communication performance notification means 115 notifies the communication apparatus that communicates with the communication terminal of the target value of the communication performance. Specifically, the communication performance notification means 115 notifies the communication apparatus of the target value of the communication performance through the communication line between the management apparatus 11 and the communication apparatus.

Meanwhile, the communication apparatus acquires the target value of the communication performance from the management apparatus 11, and controls the communication with the communication terminal based on the acquired target value of the communication performance.

The management apparatus 11 notifies a communication apparatus 12 (not shown) of the target value of the communication performance through the communication line, and controls the communication so that the service provided to the communication terminal meets the target KPI. When the KPI is defined so that a value becomes lower as performance becomes better, for example, when the KPI is an indicator of risk, the management apparatus 11 detects a component in which the predicted KPI is equal to or higher than the target KPI. The management apparatus 11 controls the detected component such as the communication terminal through the communication apparatus so that the predicted KPI becomes less than the target KPI. On the other hand, when the KPI is defined so that a value becomes higher as performance becomes better, for example, when the KPI is an indicator of throughput, the management apparatus 11 detects a component in which the predicted KPI is less than the target KPI. The management apparatus 11 controls the detected component such as the communication terminal through the communication apparatus so that the predicted KPI becomes equal to or greater than the target KPI.

Next, an entire system including the management apparatus according to the first example embodiment is described.

Figure 2:
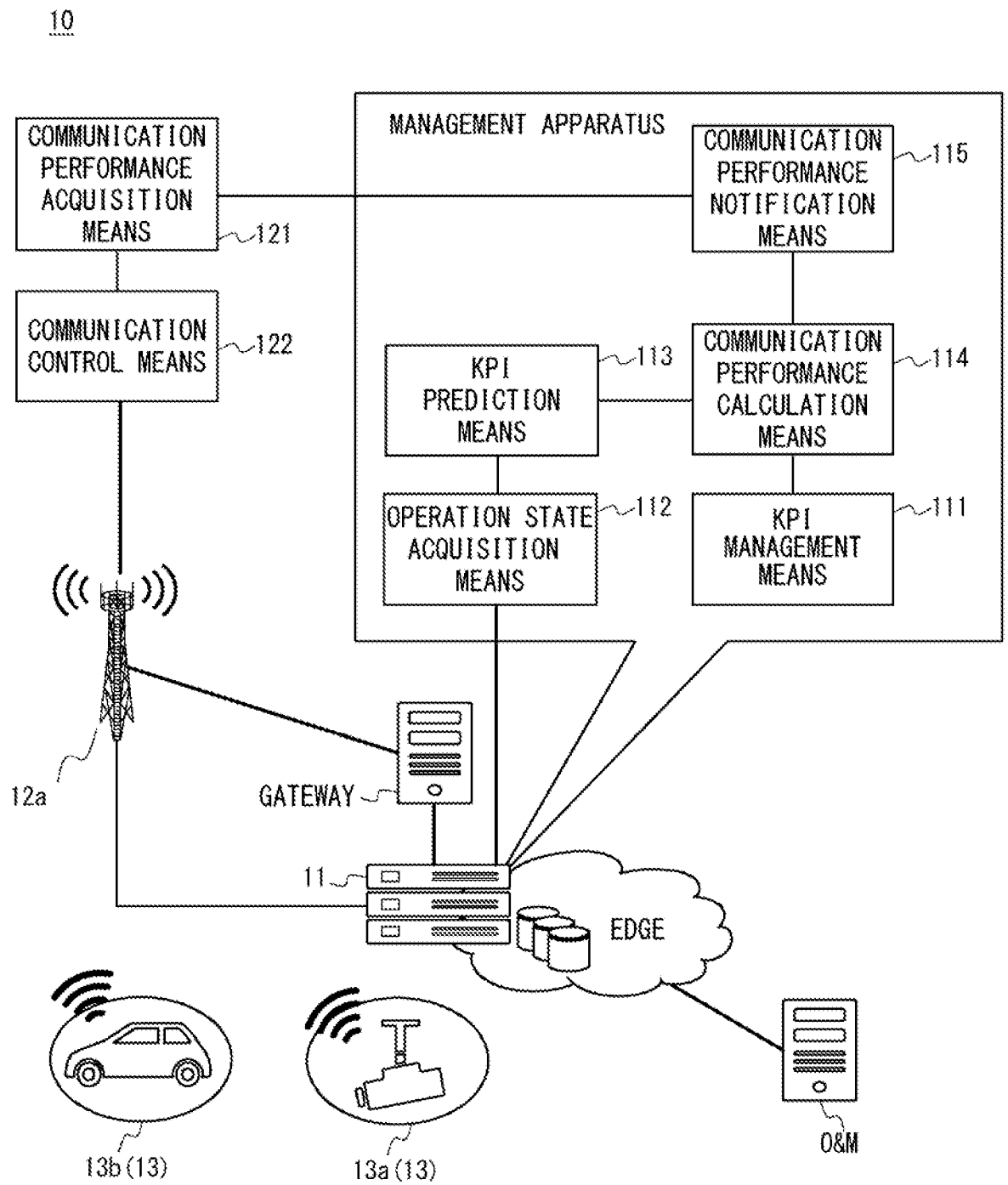
FIG. 2 is a block diagram illustrating a system according to the first example embodiment.

FIG. 2 is a block diagram illustrating the system according to the first example embodiment.

As shown in FIG. 2, a system 10 according to the first example embodiment includes a communication terminal 13, the communication apparatus 12 that provides a service to the communication terminal 13, and the management apparatus 11 that manages the communication apparatus 12 and the communication terminal 13.

The communication apparatus 12 is, for example, a base station 12a in Long Term Evolution (LTE). The communication terminal 13 is, for example, an IoT device 13a such as a camera or an IoT device 13b mounted on a vehicle. In this example, the communication apparatus 12 is described as the base station 12a in the Long Term Evolution (LTE), and the communication terminal 13 is described as the IoT device 13a.

Note that in FIG. 2, communication performance acquisition means 121 and communication control means 122 are provided outside the base station 12a, but they may instead be provided inside the base station 12a.

The communication apparatus 12 includes the communication performance acquisition means 121 and the communication control means 122. The communication performance acquisition means 121 acquires, from the management apparatus 11, a target value of communication performance of a component necessary for a service provided to the IoT device 13a. The communication control means 122 controls the communication with the IoT device 13a based on the target value of the communication performance.

First, the KPI management means 111 of the management apparatus 11 acquires, from Operation and Maintenance (O&M), information about the KPI of the service for each IoT device 13a to be managed. The information about the KPI of the service is information for specifying the KPI of the service and its requirements. The information about the KPI of the service includes, for example, at least one of a type of the service, a definition of the KPI, a method for acquiring element data that constitutes the definition, and a target value of the KPI. The target value of the KPI is the target KPI described above. The method for acquiring element data includes the type of data, the amount of data, the acquisition destination, and a cycle of acquisition.

Next, the operation state acquisition means 112 acquires element data regarding a component necessary for a service, the element data being necessary for calculation of a KPI which is one of the quality indicators of the service. The component includes the IoT device 13a connected to the base station 12a, and a communication line between the IoT device 13a and the base station 12a. In addition to the IoT device 13a, for example, a mobile terminal used by a user is connected to the base station 12a through the communication line. The IoT device 13a is, for example, a monitoring camera, and the mobile terminal used by a user is, for example, a smartphone. Thus, the component includes the IoT device 13a, the mobile terminal of a user, and the communication line.

The element data is data indicating features of a control system of an IoT service, and is data regarding a component of the control system of the IoT service, such as the IoT device 13a, a user, an application, and a communication line.

The element data regarding the IoT device 13a is, for example, data indicating features such as identification information, an internal state, an external state, and a version of control software of the device. The internal state is data indicating a position, speed, acceleration, and an operation mode. The operation mode includes an automatic operation mode and a manual operation mode. The external state is data indicating environmental sensor information such as a camera video image and a millimeter-wave radar.

The element data regarding a user is, for example, data indicating features such as identification information of a user and a state of a user. The state of a user is data indicating whether the user is using the device and the degree of arousal of the user. The degree of arousal of the user is data indicating that the user is driving, that the user is performing another work, or that the user is sleeping.

The element data regarding an application is, for example, data indicating features such as the amount of communication data of the application and the communication cycle of the application.

The element data regarding a communication line is, for example, data indicating features such as communication quality between the IoT device 13a and a server for a service. The communication quality includes throughput, delay time, and reliability.

Note that the operation state acquisition means 112 may acquire identification information of the IoT device and identification information of a user through the communication terminal such as a smartphone owned by the user or the IoT device and associate the acquired identification information of the IoT device with the acquired identification information of the user.

Specifically, a user photographs, by using a camera (not shown) of the smartphone owned by the user, a QR code (registered trademark) that is attached to a vehicle which the user uses and that indicates identification information of the vehicle. The smart phone sends the QR code (registered trademark) together with identification information (indicating identification information of the user) of the SIM of the smart phone to the management apparatus 11 (the server). The operation state acquisition means 112 of the management apparatus 11 acquires the QR code (registered trademark) and the identification information of the SIM and associates the identification information of the vehicle with the identification information of the user. A label of an individual vehicle number may be used in place of the QR code (registered trademark).

In another specific example, the IoT device of the vehicle and the smart phone owned by the user exchange their identification information with each other by using terminal-to-terminal communication. Then, one of the IoT device and the smart phone transmits its identification information to the management apparatus 11.

Further, the operation state acquisition means 112 may start acquiring element data by using the connection of the IoT device 13a to the base station 12a as a trigger.

Further, the operation state acquisition means 112 may start acquiring element data when the IoT device 13b mounted on the vehicle is located within a predetermined area. Specifically, when the management apparatus 11 manages the position of the IoT device 13b and it is found that the IoT device 13b has entered the predetermined area, the operation state acquisition means 112 may start acquiring element data.

The KPI prediction means 113 calculates a time series of a predicted KPI which is the predicted value of the KPI of the service of the IoT device 13a within a predetermined period based on the element data pieces collected by the operation state acquisition means 112.

Specifically, the KPI prediction means 113 first predicts, based on the element data of the IoT device 13a acquired in the past, at least one of a response characteristic of the IoT device 13a and a response characteristic of a user who uses the IoT device 13a.

In the safe driving support service, as a response characteristic of a user, for example, a response delay for each age and sex of the user (the driver) and total traveling distance is predicted. As a response characteristic of the IoT device 13a, for example, a response characteristic such as a deceleration performance of a brake for each vehicle type and a processing delay of an application is predicted. Note that the element data may be referred to as operation data. The operation data may be referred to as an operation history.

The KPI prediction means 113 models in advance a dynamic characteristic of the IoT device 13a to be managed. The dynamic characteristic is modeled by taking into consideration a surrounding environment in which the IoT device 13a is used. The KPI prediction means 113 predicts, in time series, states of the IoT device 13a such as a position thereof based on the element data of the IoT device 13a and the dynamic characteristic model of the IoT device 13a. The element data of the IoT device 13a includes, for example, information indicating a position, speed, acceleration, a state, and a rate of change of the state of the IoT device 13a. Note that the dynamic characteristic model is, for example, a model using an equation of motion.

Further, the KPI prediction means 113 may calculate the predicted KPI based on at least one of the element data of the IoT device 13a, the dynamic characteristic model of the IoT device 13a, and the response characteristic of a user who uses the IoT device 13a.

Note that as the response characteristics of the IoT device 13a and a user, a previously prepared general response characteristic common to the service may be used instead of a model specific to an area based on the operation data of the IoT device 13a.

A prediction method performed by the KPI prediction means 113 is specifically described below by using an example in which a subjective risk of driving in the safe driving support service is predicted.

First, the KPI prediction means 113 applies the position, the speed, and the acceleration of the vehicle acquired by the operation state acquisition means 112 to the equation of motion and thereby predicts a time series of the position and the speed of the vehicle.

Next, the KPI prediction means 113 selects a vehicle having a high risk of a rear-end collision within a predetermined period based on a result of the prediction. Further, the KPI prediction means 113 calculates a communication delay from the throughput of the communication line of the vehicle and the amount of the communication data of the application.

Next, the KPI prediction means 113 specifies a processing delay of the application, a response delay according to the attribute of a driver, and a brake performance according to the vehicle type from the operation data of the vehicle.

Lastly, the KPI prediction means 113 calculates a subjective risk of driving between vehicles having a high risk of a rear-end collision by taking the above information pieces into consideration. Specifically, the KPI prediction means 113 calculates a subjective risk of driving during the period until the driver applies the brake based on a result of the prediction of the time series of the position and the speed of the vehicle. At this time, a delay time until the driver recognizes an alert issued by the application is taken into consideration based on various types of delay times. Further, the KPI prediction means 113 predicts a subjective risk of driving after the driver applies the brake by taking the braking time into consideration based on the speed and the braking performance of the vehicle.

Further, the following description is given below of a case in which the KPI prediction means 113 predicts a synthesis error of Augmented Reality (AR) when a KPI of the AR service is predicted.

First, when a synthetic error of AR is predicted, the KPI prediction means 113 applies the position, the speed, and the acceleration of an AR device to the equation of motion and thereby predicts a time series of the position of the AR device.

Next, the KPI prediction means 113 calculates a communication delay from the throughput of the communication line of the AR device and the amount of the communication data of the application and specifies a processing delay of the application from the operation data (the operation history).

Lastly, the KPI prediction means 113 calculates a synthesis error of AR based on a result of the prediction of the time series of the position of the AR device and the various types of delay times.

Referring again to FIG. 2, when the KPI is defined so that a value becomes lower as performance becomes better, the communication performance calculation means 114 detects the IoT device 13a in which the predicted KPI is equal to or greater than the target KPI, which indicates a targeted level, within a predetermined period.

The communication performance calculation means 114 calculates a target value of communication performance for the detected IoT device 13a based on the predicted KPI and the target KPI (so that the predicted KPI becomes less than the target KPI).

Specifically, the communication performance calculation means 114 calculates an allowable communication delay time which is a communication delay time that can be allowed in order for the predicted KPI to become less than the target KPI based on the time series of the KPI. The allowable communication delay time is an upper limit value of the communication delay time that can be allowed. The allowable communication delay time is a time required for communication between the base station 12a and the IoT device 13a. The target value of the communication performance includes, for example, completion of transmission and reception of a predetermined amount of communication data within a range of a predetermined delay time.

A state in which the predicted KPI does not meet the target KPI indicates that the value of the predicted KPI falls below the value of the target KPI or that value of the predicted KPI exceeds the value of the target KPI. For example, when the KPI indicates a risk of a vehicle accident, the state in which the predicted KPI does not meet the target KPI means a state in which the value of the predicted KPI exceeds the value of the target KPI, that is, a state in which the probability of the risk of the accident is high. Further, for example, when the KPI indicates the throughput of the communication line, the state in which the predicted KPI does not meet the target KPI means a state in which the value of the predicted KPI falls below the value of the target KPI, that is, a state in which the throughput is low.

Note that in the case of a subjective risk of driving in the safe driving support service, the communication performance calculation means 114 calculates an upper limit value of the communication delay by taking into consideration the processing delay of the application and the response time of a driver so that the braking of the vehicle is started before the predicted value of the subjective risk of driving exceeds the target value.

Further, in the case of a synthesis error of AR, the communication performance calculation means 114 calculates an upper limit value of the communication delay by taking the processing delay of the application into consideration so that the amount of change of the position of the AR device does not exceed the target value.

At this time, the communication performance calculation means 114 may adjust the amount of data of the application so that the communication delay falls within a feasible range. That is, the communication performance calculation means 114 adjusts the amount of data to be transmitted from the base station 12a to the IoT device 13a so that transmission of the amount of the data is completed within the allowable communication delay time. After that, the communication performance notification means 115 notifies the base station 12a of information regarding this amount of the data.

Further, the communication performance calculation means 114 may determine, from the upper limit of the communication performance in the specifications, whether the communication delay can fall within a feasible range.

Specifically, the communication performance calculation means 114 uses the upper limit of the communication performance in the specifications as the upper limit of the feasible range. For example, the communication performance calculation means 114 transmits a predetermined amount of data when it is possible to make the throughput required to keep the delay time within a range of the allowable communication delay time lower than the upper limit value of the throughput in the specifications. Meanwhile, the communication performance calculation means 114 transmits a smaller amount of data than the predetermined amount of data when it is not possible to make the throughput required to keep the delay time within the range of the allowable communication delay time lower than the upper limit value of the throughput in the specifications. Specifically, the amount of data is reduced by reducing resolution of image data or changing a data type from image data to text data.

Further, the communication performance calculation means 114 may adjust the target value of the communication performance among a plurality of IoT devices 13a so that the predicted KPI becomes less than the target KPI when the predicted KPI depends on a plurality of communication lines between the base station 12a and each of the plurality of IoT devices 13a.

Specifically, the management apparatus 11 may perform communication control such as strictly setting a target value of communication performance of the IoT device 13a having a communication line with a good radio quality (i.e., setting the target value to be high) and loosely setting a target value of communication performance of the IoT device 13a having a communication line with a poor radio quality (i.e., setting the target value to be low).

Further, when the KPI is defined so that a value becomes lower as performance becomes better and when it is predicted that the predicted KPI will be equal to or greater than the target KPI even if the above communication control is performed, the communication performance notification means 115 of the management apparatus 11 may notify the IoT device 13a that the predicted KPI is equal to or greater than the target KPI (i.e., the target cannot be met).

Specifically, the communication performance calculation means 114 predicts the maximum throughput based on the radio quality of the communication line and calculates the minimum value of the communication delay by taking the amount of data of the application into consideration. Further, when the calculated delay time cannot meet the target value, the communication performance calculation means 114 determines that the target value cannot be met by the communication control, and notifies the IoT device 13a of this determination.

The communication performance notification means 115 notifies the base station 12a of the target value of the communication performance calculated by the communication performance calculation means 114.

The communication performance acquisition means 121 of the base station 12a acquires, from the management apparatus 11, the target value of the communication performance of the communication line for the service provided to the communication terminal 13. The communication control means 122 controls communication with the communication terminal 13 based on the acquired target value.

That is, the communication control means 122 controls communication so that it is effective in achieving the target value of the communication performance. The communication performance includes, for example, completing transmission and reception of a predetermined amount of communication data within a range of a predetermined delay time. The communication control method includes, for example, a method for adjusting priority of scheduling in accordance with the remaining amount of data in the communication buffer so that transmission and reception of a predetermined amount of data is completed within a predetermined delay time.

In the first example embodiment, the management apparatus 11 sets a target value of communication performance for the communication line between the base station 12a and the IoT device 13a. At this time, the management apparatus 11 calculates a predicted KPI of the service to be provided to the IoT device 13a based on the response characteristics of the IoT device 13a and a user. Then, a target value of required communication performance is calculated based on the predicted KPI and the target KPI calculated by the management apparatus 11, and the base station 12a is notified of the calculated target value. The base station 12a controls communication with the IoT device 13a based on the target value.

In the first example embodiment, by controlling in this manner, even when communication performance necessary for achieving the target KPI differs for each IoT device 13a, a target value of the communication performance can be set for each IoT device 13a. Thus, it is possible to reduce the number of IoT devices 13a that cannot achieve the target KPI.

As a result, according to the first example embodiment, it is possible to provide a management apparatus, a communication apparatus, and a system capable of providing a service that meets a targeted KPIs.

Note that in the first example embodiment, an example in which the management apparatus 11 is applied to Long Term Evolution (LTE) has been described, but the present disclosure is not limited thereto. The management apparatus 11 according to the first example embodiment can be applied to other networks such as a third Generation (3G) network and a fifth Generation (5G) network provided with the communication apparatus 12. Further, the management apparatus 11 may be applied to a platform in a Mobile Edge Computing/Multi-access Edge Computing (MEC) provided in the vicinity (edge) of the communication terminal 13.

Further, the management apparatus 11 according to the first example embodiment can be applied to various types of areas of social systems such as an Augmented Reality/Virtual Reality (AR/VR) service, a safe driving support service for an automobile, and an automated driving technology. Furthermore, the management apparatus 11 according to the first example embodiment can be applied to various types of areas of social systems such as automated transportation in factories and warehouses, a security robot, a robot for disaster investigation, and an automatic operation of a drone for inspection and home delivery. In particular, in technologies such as automated driving, by using a mobile network and sharing vicinity information in real time, it is possible to avoid collision of vehicles and operate vehicles more safely.

Comparative Example

Figure 3:
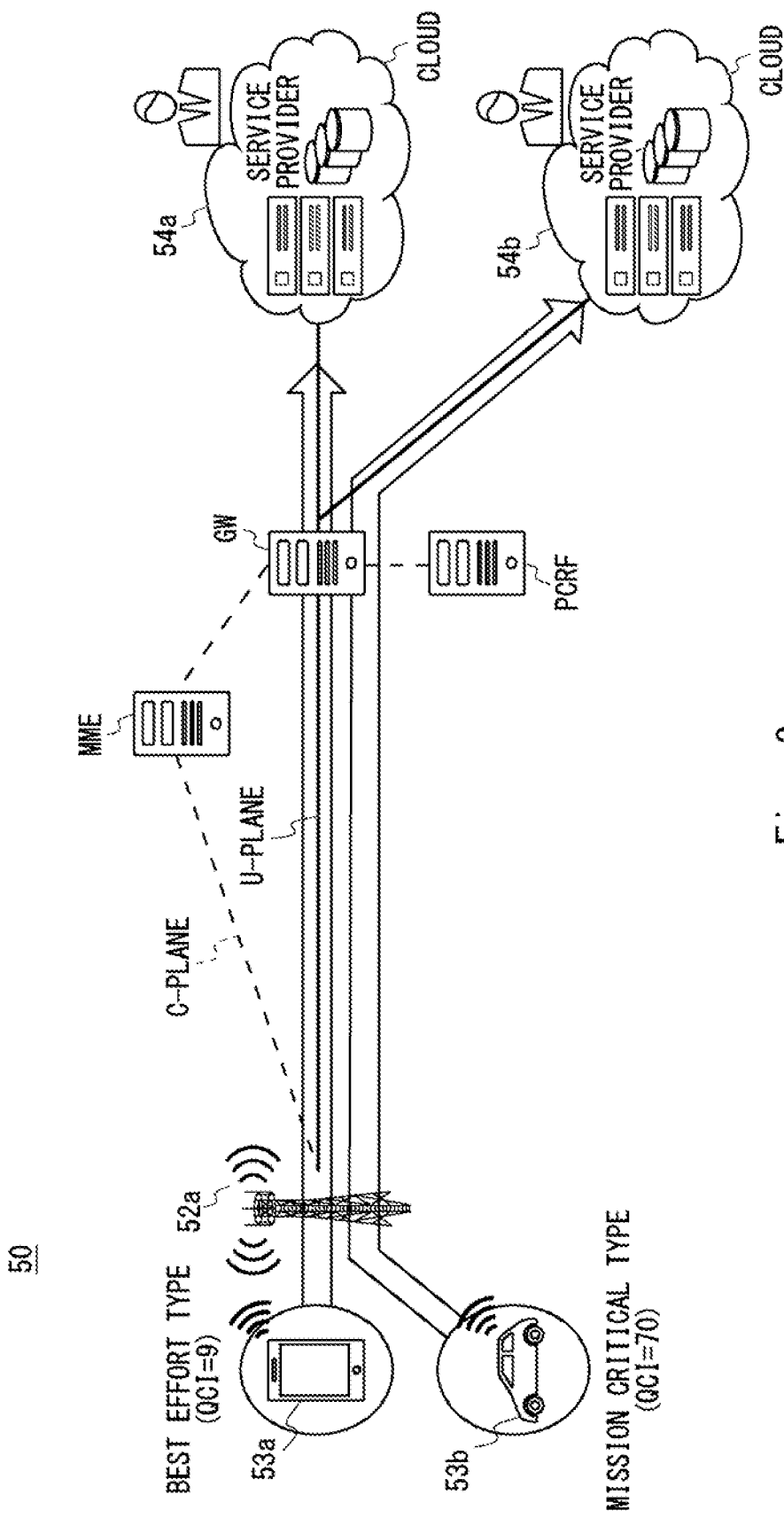
FIG. 3 is a block diagram illustrating a system according to a comparative example of the first example embodiment.

FIG. 3 is a block diagram illustrating a system according to a comparative example of the first example embodiment.

As shown in FIG. 3, in a system 50 according to the comparative example, traffic of different services of a service provider 54a and a service provider 54b is contained in the same network to share radio resources. In this case, a QoS Class Identifier (QCI), which is a standard Quality of Service (QoS) requirement, is set equally for each service, and a Policy and Charging Rules Function (PCRF) controls the QoS of communication. The PCRF performs QoS control based on fairness and system efficiency for services having the same QCI. In the comparative example, the service provider 54a providing services of Best Effort type (BE) has a QCI of 9, and the service provider 54b providing services of Mission Critical type (MC) has a QCI of 70.

In the system 50 according to the comparative example, QCI, which is a standard QoS requirement, is set equally for each service. Therefore, the communication performance corresponding to the QCI may be insufficient for some of the IoT devices 53a or the IoT devices 53b. The IoT devices 53a or the IoT devices 53b having insufficient communication performance cannot meet the target KPI.

In the comparative example, since some IoT devices may not be able to meet the target KPI, it is difficult to provide a management apparatus, a communication apparatus, and a system capable of providing a service that meets a targeted KPI.

Second Example Embodiment

Figure 4:
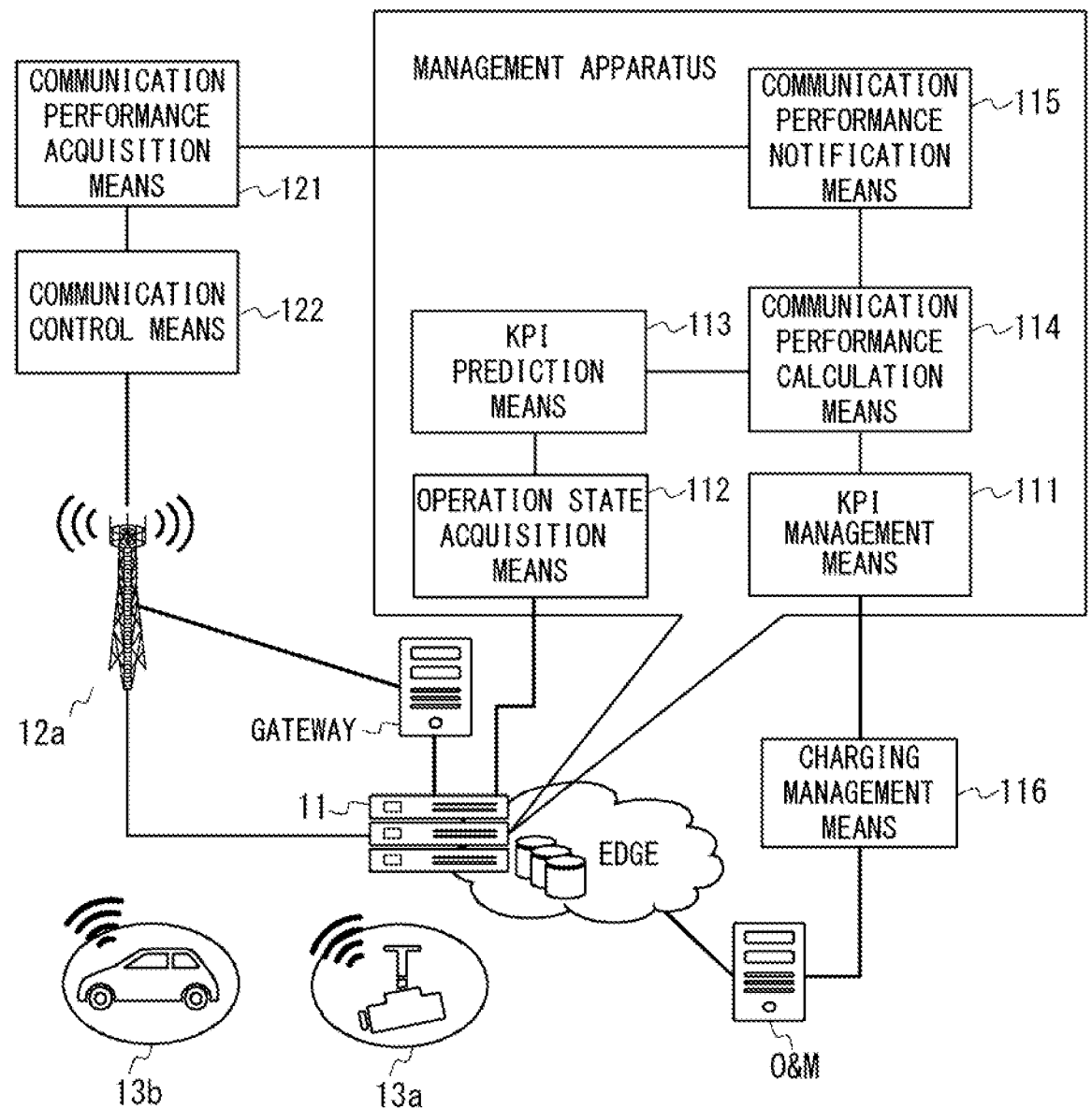
FIG. 4 is a block diagram illustrating a system according to a second example embodiment.

FIG. 4 is a block diagram illustrating a system according to a second example embodiment.

As shown in FIG. 4, a system 20 according to the second example embodiment differs from the system 10 according to the first example embodiment in that the system 20 further includes charging management means 116.

The base station 12a controls communication with the IoT device 13a. The KPI management means 111 acquires information about the effect of the control of the communication on the IoT device 13a detected by the communication performance calculation means 114, that is, the IoT device 13a in which the predicted KPI of the service has become less than the target KPI within a predetermined period.

The KPI management means 111 of the management apparatus 11 notifies the charging management means 116 of the O&M of the acquired information about the effect of the control of the communication. In FIG. 4, the charging management means 116 is provided outside the management apparatus 11, but this configuration is merely an example. The management apparatus 11 may include some functions of the O&M, including the charging management means 116.

Here, among the events in which the communication control means 122 applies communication control to the IoT device 13a detected by the communication performance calculation means 114, an event in which the actual value of the KPI of the service continuously meets the target within a predetermined period from the application of the communication control is regarded as an event in which the communication control is effective. That is, an event in which a state in which the target has not been achieved is changed to a state in which the target has been achieved is regarded as an event in which communication control is effective. The change is referred to as a conversion.

The KPI management means 111 collects information about the effect of the communication control such as the total number of events in which the communication control is applied, the total number of events in which conversion has been achieved, the total amount of radio resources required to achieve the conversion, the predicted value of the predicted KPI of the service, and the actual value of the KPI of the service. The KPI management means 111 notifies the charging management means 116 of the information about the effect of the communication control and identification information of the IoT device 13a.

The charging management means 116 acquires information about the effect of the communication control from the KPI management means 111. The charging management means 116 determines the amount of charging for the IoT device 13a based on the information about the effect of the communication control.

The charging management means 116 may perform charging, for example, in accordance with a predetermined rule in units of events in which conversion has been achieved.

Further, the charging management means 116 may measure a duration of target achievement in which the predicted KPI has become equal to or greater than the target KPI and perform charging based on the duration of target achievement.

Further, the charging management means 116 may perform unique charging which differs in accordance with the types and the purposes of the services for the IoT device 13a. That is, the charging management means 116 selects a calculation method for charging based on at least one of the type and the purpose of the service for the IoT device 13a, calculates an amount of money to be charged using the selected calculation method, and performs charging for the IoT device 13a.

Further, the charging management means 116 notifies, for example, a management server (not shown) of an IoT service which the IoT device 13a has made a contract with of the identification information of the IoT device 13a and the information about the effect of the communication control. The management server of the IoT service may notify the charging management means 116 of the amount of money to be paid for the communication service of the IoT device 13a in accordance with a predetermined rule. At this time, the charging management means 116 may discount the communication charge of the IoT device 13a based on the notified amount of money.

Further, when the management server of the IoT service acquires the identification information of the IoT device 13a and the information about the effect of the communication control from the charging management means 116, the management server of the IoT service may discount the communication charge to the IoT device 13a in accordance with a predetermined rule.

Specifically, in a safe driving support service, for each event in which the KPI of the subjective risk of driving can meet the target KPI by the communication control according to the second example embodiment, the charging management means 116 notifies the management server of information about the effect of the communication control. The management server in this case is a management server of an automobile insurance service with which a vehicle subject to the safe driving support service has made a contract. Further, the charging management means 116 may discount, in accordance with a predetermined rule, the insurance premium of the insurance service with which the vehicle subject to the safe driving support service has made a contract.

Note that the predetermined rule is a rule for determining a charge for a communication service or other services based on information about the effect of the communication control. The predetermined rule is, for example, to pay out the amount of YY when the number of conversions is XX or more. Further, the predetermined rule is registered in advance by a service administrator in the O&M or the management server of the service. Note that "XX" indicates any number of one or greater, and "YY" indicates any amount of money.

As described above, according to the second example embodiment, flexible service charging can be achieved based on the actual results of the communication control for the communication line of the IoT device 13a.

Note that although the present disclosure has been described as a hardware configuration in the above-described example embodiments, the present disclosure is not limited thereto. In the present disclosure, it is also possible to implement processing of each component by causing a Central Processing Unit (CPU) to execute a computer program.

In the above-described example embodiments, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and may be modified as appropriate without departing from the spirit of the present disclosure.

The whole or part of the example embodiments disclosed above can be described as, but not limited to, the following supplementary notes.

(Supplementary Note 1)

A management apparatus comprising:

KPI management means for acquiring a target Key Performance Indicator (KPI) of a service that is provided to a communication terminal by a business operator;

operation state acquisition means for acquiring element data regarding a component necessary for the service, the element data indicating a feature of a control system of the service;

KPI prediction means for calculating a predicted KPI which is a predicted value of the KPI of the service based on the element data;

communication performance calculation means for, when the KPI is defined so that a value becomes lower as performance becomes better, detecting the component in which the predicted KPI is equal to or greater than the target KPI and calculating a target value of communication performance of the detected component so that the predicted KPI becomes less than the target KPI based on the predicted KPI and the target KPI; and communication performance notification means for notifying a communication apparatus to which the communication terminal is connected of the target value of the communication performance.

(Supplementary Note 2)

The management apparatus described in Supplementary Note 1, wherein the communication performance notification means notifies the communication apparatus of the target value of the communication performance through a communication line between the management apparatus and the communication apparatus.

(Supplementary Note 3)

The management apparatus described in Supplementary Note 1 or 2, wherein the component comprises at least one of the communication terminal and a communication line between the communication terminal and the communication apparatus.

(Supplementary Note 4)

The management apparatus described in any one of Supplementary notes 1 to 3, wherein the KPI prediction means predicts, based on the element data, at least one of a response characteristic of the communication terminal and a response characteristic of a user who uses the communication terminal.

(Supplementary Note 5)

The management apparatus described in Supplementary Note 4, wherein the KPI prediction means calculates the predicted KPI based on at least one of the element data of the communication terminal, a dynamic characteristic model of the communication terminal, and the response characteristic of the user.

(Supplementary Note 6)

The management apparatus described in any one of Supplementary notes 1 to 5, wherein the KPI management means acquires the target KPI from Operation and Maintenance (O&M).

(Supplementary Note 7)

The management apparatus described in any one of Supplementary notes 1 to 6, wherein when the KPI is defined so that a value becomes lower as performance becomes better, the communication performance calculation means detects the component in which the predicted KPI is equal to or greater than the target KPI within a predetermined period.

(Supplementary Note 8)

The management apparatus described in any one of Supplementary notes 1 to 7, wherein the communication performance calculation means calculates an allowable communication delay time which is a communication delay time that can be allowed in order for the predicted KPI to become less than the target KPI, the allowable communication delay time being a time required for communication between the communication apparatus and the communication terminal.

(Supplementary Note 9)

The management apparatus described in Supplementary Note 8, wherein the communication performance calculation means adjusts an amount of data to be transmitted from the communication apparatus to the communication terminal so that transmission of the amount of the data is completed within the allowable communication delay time, and the communication performance notification means notifies the communication apparatus of information about the amount of the data.

(Supplementary Note 10)

The management apparatus described in Supplementary Note 3, wherein the communication performance calculation means adjusts the target value of the communication performance among a plurality of the communication terminals so that the predicted KPI becomes less than the target KPI when the predicted KPI depends on a plurality of the communication lines between the communication apparatus and each of the plurality of the communication terminals.

(Supplementary Note 11)

The management apparatus described in any one of Supplementary notes 1 to 10, wherein when the KPI is defined so that a value becomes lower as performance becomes better and when it is predicted that the predicted KPI will be equal to or greater than the target KPI, the communication performance notification means notifies the communication terminal that the predicted KPI is equal to or greater than the target KPI.

(Supplementary Note 12)

The management apparatus described in any one of Supplementary notes 1 to 11, wherein the communication apparatus controls communication with the communication terminal;

the KPI management means notifies charging management means of information about an effect of the control of the communication on the communication terminal detected by the communication performance calculation means, and the charging management means determines an amount of charging for the communication terminal based on the information about the effect of the control of the communication.

(Supplementary Note 13)

The management apparatus described in any one of Supplementary notes 1 to 12, wherein the communication apparatus comprises the management apparatus.

(Supplementary Note 14)

The management apparatus described in any one of Supplementary notes 1 to 13, wherein the management apparatus is provided in a vicinity of the communication terminal.

(Supplementary Note 15)

A communication apparatus comprising:

communication performance acquisition means for acquiring a target value of communication performance for a service provided to a communication terminal; and communication control means for controlling communication with the communication terminal based on the target value.

(Supplementary Note 16)

A communication system comprising a communication terminal, a communication apparatus configured to provide a service to the communication terminal, and a management apparatus configured to manage the communication apparatus and the communication terminal, wherein the management apparatus comprises:

KPI management means for acquiring a target Key Performance Indicator (KPI) of the service that is provided to the communication terminal by a business operator;

operation state acquisition means for acquiring element data regarding a component necessary for the service, the element data indicating a feature of a control system of the service;

KPI prediction means for calculating a predicted KPI which is a predicted value of the KPI of the service based on the element data;

communication performance calculation means for, when the KPI is defined so that a value becomes lower as performance becomes better, detecting the component in which the predicted KPI is equal to or greater than the target KPI and calculating a target value of communication performance of the detected component so that the predicted KPI becomes less than the target KPI based on the predicted KPI and the target KPI; and communication performance notification means for notifying the communication apparatus to which the communication terminal is connected of the target value of the communication performance, and the communication apparatus comprises:

communication performance acquisition means for acquiring the target value of the communication performance for the service provided to the communication terminal; and communication control means for controlling communication with the communication terminal based on the target value.

(Supplementary Note 17)

A method comprising:

acquiring a target Key Performance Indicator (KPI) of a service provided to a communication terminal;

acquiring element data regarding a component necessary for the service, the element data indicating a feature of a control system of the service;

calculating a predicted KPI which is a predicted value of the KPI of the service based on the element data;

when the KPI is defined so that a value becomes lower as performance becomes better, detecting the component in which the predicted KPI is equal to or greater than the target KPI and calculating a target value of communication performance of the detected component so that the predicted KPI becomes less than the target KPI based on the predicted KPI and the target KPI; and notifying a communication apparatus to which the communication terminal is connected of the target value of the communication performance.

(Supplementary Note 18)

A program for causing a computer to:

acquire a target Key Performance Indicator (KPI) of a service provided to a communication terminal;

acquire element data regarding a component necessary for the service, the element data indicating a feature of a control system of the service;

calculate a predicted KPI which is a predicted value of the KPI of the service based on the element data;

when the KPI is defined so that a value becomes lower as performance becomes better, detect the component in which the predicted KPI is equal to or greater than the target KPI and calculate a target value of communication performance of the detected component so that the predicted KPI becomes less than the target KPI based on the predicted KPI and the target KPI; and notify a communication apparatus to which the communication terminal is connected of the target value of the communication performance.

While the present disclosure has been described with reference to the example embodiments, the present disclosure is not limited to the above-described example embodiments. Various changes that can be understood by those skilled in the art can be made to the configurations and the details of the present disclosure within the scope of the present disclosure.

This application is based upon and claims the benefit of priority from Japanese patent application No. 2018-159041, filed on Aug. 28, 2018, the disclosure of which is incorporated herein in its entirety by reference.

REFERENCE SIGNS LIST 10, 20, 50 SYSTEM
11 MANAGEMENT APPARATUS
111 KPI MANAGEMENT MEANS
112 OPERATION STATE ACQUISITION MEANS
113 KPI PREDICTION MEANS
114 COMMUNICATION PERFORMANCE CALCULATION MEANS
115 COMMUNICATION PERFORMANCE NOTIFICATION MEANS
116 CHARGING MANAGEMENT MEANS
12 COMMUNICATION APPARATUS
12a, 52a BASE STATION
121 COMMUNICATION PERFORMANCE ACQUISITION MEANS
122 COMMUNICATION CONTROL MEANS
13 COMMUNICATION TERMINAL
13a, 13b, 53a, 53b IoT DEVICE
54a, 54b SERVICE PROVIDER

What is claimed is:

1. A management apparatus comprising:
   at least one memory storing instructions, and
   at least one processor configured to execute the instructions to:
   acquire a target Key Performance Indicator (KPI) of a service that is provided to a communication terminal by a business operator;
   acquire element data regarding a component necessary for the service;
   calculate a predicted KPI of the service based on the element data;
   calculate a target value of communication performance based on a comparison between the predicted KPI and the target KPI of the service; and
   notify a communication apparatus to which the communication terminal is connected of the target value of the communication performance; and
   wherein when a KPI is defined such that a value of the KPI becomes lower as performance becomes better, the at least one processor is configured to detect the component in which the predicted KPI is equal to or greater than the target KPI within a predetermined period.

2. The management apparatus according to claim 1, wherein the at least one processor is configured to notify the communication apparatus of the target value of the communication performance through a communication line between the management apparatus and the communication apparatus.

3. The management apparatus according to claim 1, wherein the component comprises at least one of the communication terminal and a communication line between the communication terminal and the communication apparatus.

4. The management apparatus according to claim 1, wherein the at least one processor is configured to further predict, based on the element data, at least one of a response characteristic of the communication terminal and a response characteristic of a user who uses the communication terminal.

5. The management apparatus according to claim 4, wherein the at least one processor is configured to calculate the predicted KPI based further on at least one of element data of the communication terminal, a dynamic characteristic model of the communication terminal, and the response characteristic of the user.

6. The management apparatus according to claim 1, wherein the at least one processor is configured to acquire the target KPI from Operation and Maintenance (O&M).

7. The management apparatus according to claim 1, wherein the at least one processor is configured to further calculate an allowable communication delay time that is permitted for the predicted KPI to become less than the target KPI, the allowable communication delay time being a time required for communication between the communication apparatus and the communication terminal.

8. The management apparatus according to claim 7, wherein
   the at least one processor is configured to adjust an amount of data to be transmitted from the communication apparatus to the communication terminal so that transmission of the amount of the data is completed within the allowable communication delay time, and
   the at least one processor is configured to further notify the communication apparatus of information about the amount of the data.

9. The management apparatus according to claim 3, wherein
   the communication terminal is one of a plurality of communication terminals, the communication line is one of a plurality of communication lines, the communication apparatus is connected to each communication terminal by a respective one of the communication lines, and
   the at least one processor is configured to adjust the target value of the communication performance among the communication terminals so that the predicted KPI becomes less than the target KPI when the predicted KPI depends on the communication lines.

10. The management apparatus according to claim 1, wherein when a KPI is defined such that a value of the KPI becomes lower as performance becomes better and when the predicted KPI is equal to or greater than the target KPI, the at least one processor is configured to notify the communication terminal that the predicted KPI is equal to or greater than the target KPI.

11. The management apparatus according to claim 1, wherein
   the communication apparatus controls communication with the communication terminal,
   the at least one processor is configured to notify a charging management apparatus of information about an effect of control of the communication on the communication terminal, and
   the charging management apparatus determines an amount of charging for the communication terminal based on the information about the effect of the control of the communication.

12. The management apparatus according to claim 1, wherein the management apparatus is part of the communication apparatus.

13. The management apparatus according to claim 1, wherein the management apparatus is provided in a vicinity of the communication terminal.

14. A method comprising:
   acquiring a target Key Performance Indicator (KPI) of a service provided to a communication terminal;

acquiring element data regarding a component necessary for the service;

calculating a predicted KPI of the service based on the element data;

calculating a target value of communication performance based on a comparison between the predicted KPI and the target KPI of the service; and notifying a communication apparatus to which the communication terminal is connected of the target value of the communication performance; and wherein when a KPI is defined such that a value of the KPI becomes lower as performance becomes better, the at least one processor is configured to detect the component in which the predicted KPI is equal to or greater than the target KPI within a predetermined period.

* * * * *